US011451959B2

(12) United States Patent
Windsor et al.

(10) Patent No.: US 11,451,959 B2
(45) Date of Patent: Sep. 20, 2022

(54) AUTHENTICATING CLIENT DEVICES IN A WIRELESS COMMUNICATION NETWORK WITH CLIENT-SPECIFIC PRE-SHARED KEYS (71) Applicant: Fortinet, Inc., Sunnyvale, CA (US)

(72) Inventors: Carl M. Windsor, Wilmslow (GB); Ruben S. Wilson, Oswestry (GB); Yannick Dubuc, Port Moody (CA)

(73) Assignee: Fortinet, Inc., Sunnyvale, CA (US)

( * ) Notice: Subject to any disclaimer, the term of this patent is extended or adjusted under 35 U.S.C. 154(b) by 443 days.

(21) Appl. No.: 16/587,514

(22) Filed: Sep. 30, 2019

(65) Prior Publication Data
US 2021/0099873 A1    Apr. 1, 2021

(51) Int. Cl.
*H04W 12/069* (2021.01)
*H04W 12/106* (2021.01)
*H04W 12/108* (2021.01)
*H04W 12/033* (2021.01)

(52) U.S. Cl.
CPC ....... *H04W 12/069* (2021.01); *H04W 12/033* (2021.01); *H04W 12/106* (2021.01); *H04W 12/108* (2021.01)

(58) Field of Classification Search
CPC . H04W 12/06; H04W 12/08; H04W 12/0431; H04W 12/50; H04W 12/062; H04W 12/069; H04W 12/106; H04W 12/108; H04W 12/033; H04L 63/083; H04L 2209/80
See application file for complete search history.

(56) References Cited

U.S. PATENT DOCUMENTS 7,373,508 B1 * 5/2008 Meier ................ H04W 12/065
                                                    713/168
8,126,145 B1 * 2/2012 Tewari ................ H04W 12/50
                                                    370/428
(Continued)

FOREIGN PATENT DOCUMENTS

EP            2372971 A1 * 10/2011 ........... H04L 63/101
EP            3319289 A1 *  5/2018 ............. G06F 21/31
WO     WO-2007111721 A2 * 10/2007 ............. H04L 63/08

*Primary Examiner* — Lizbeth Torres-Diaz
(74) *Attorney, Agent, or Firm* — HDC Intellectual Property Law, LLP (57) ABSTRACT Systems and methods for authenticating client devices accessing a wireless communication network through an access point communicatively coupled with an authentication server are provided. The authentication server receives an authentication request, including a first message integrity code (MIC) of a client-specific pre-shared key, from the access point or a wireless local area network (LAN) controller that manages the access point, to establish an encrypted communication channel between a client and the access point. In response to receipt of the authentication request, the authentication server validates the first MIC by receiving various attributes from the access point or the wireless LAN controller and determining a second MIC based on the client-specific pre-shared key of the client known to the authentication server and the received attributes so that the client-specific pre-shared key is validated to be authentic when the first MIC matches with the second MIC.

20 Claims, 9 Drawing Sheets (56) References Cited

U.S. PATENT DOCUMENTS

| | | | |
|---|---|---|---|
| 8,627,422 B2 * | 1/2014 | Hawkes | H04L 63/0869 |
| | | | 380/255 |
| 9,226,146 B2 * | 12/2015 | Ranade | H04L 63/062 |
| 9,674,892 B1 * | 6/2017 | Li | H04W 12/06 |
| 9,762,579 B2 | 9/2017 | Sakura et al. | |
| 9,948,626 B2 | 4/2018 | Zou et al. | |
| 10,129,228 B1 * | 11/2018 | Mobarak | H04L 63/083 |
| 2007/0271606 A1 * | 11/2007 | Amann | H04W 12/02 |
| | | | 726/15 |
| 2010/0031029 A1 * | 2/2010 | Ilyadis | H04W 12/069 |
| | | | 713/156 |
| 2011/0078443 A1 * | 3/2011 | Greenstein | H04L 63/061 |
| | | | 713/169 |
| 2018/0227752 A1 * | 8/2018 | Teyeb | H04W 12/50 |
| 2021/0099873 A1 * | 4/2021 | Windsor | H04L 63/0892 |

\* cited by examiner

| KEY DATABASE | | | |
|---|---|---|---|
| CLIENT MAC | SSID | KEY | PMK |
| B0-8F-93-44-52-57 | A | PUS354SDJ | IFA299E83B737C7.. |
| A0-3F-34-22-45-21 | B | DKWJU23SKL | 33014DBC1BA6AE.. |
|  | C | EFKE0035D | D1A54403C852.. |
|  | D | 3GWG45GA | 852ADF861D21 .. |

```
/**
 * CALCULATE HMACSHA1 MIC FOR EAPOLKEY FRAME
 *
 * @V KCK    KEY CONFIRMATION KEY, 16 BYTES
 * @V MSG    MESSAGE TO CALCULATE MIC OVER
 * @V LEN    NUMBER OF BYTES TO CALCULATE MIC OVER
 * @RET MIC  CALCULATED MIC, 16 BYTES LONG
 */
STATIC VOID CCMP_KIE_MIC ( CONST VOID *KCK, CONST VOID *MSG,
                          SIZE_T LEN,
                          VOID *MIC )
{
        U8 SHA1_CTX[SHA1_CTX_SIZE];
        U8 KCKB[16];
        U8 HASH[SHA1_SIZE];
        SIZE_T KCK_LEN = 16;
        MEMCPY ( KCKB, KCK, KCK_LEN );
        HMAC_INIT ( &SHA1_ALGORITHM, SHA1_CTX, KCKB, &KCK_LEN );
        HMAC_UPDATE ( &SHA1_ALGORITHM, SHA1_CTX, MSG, LEN );
        HMAC_FINAL ( &SHA1_ALGORITHM, SHA1_CTX, KCKB, &KCK_LEN, HASH );
        MEMCPY ( MIC, HASH, 16 );
}
```

AUTHENTICATING CLIENT DEVICES IN A WIRELESS COMMUNICATION NETWORK WITH CLIENT-SPECIFIC PRE-SHARED KEYS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to the field of wireless communication networks. In particular, embodiments of the present invention relate to systems and methods for authenticating client devices for access to wireless communication networks.

Description of the Related Art

A great deal of research and development continues to be directed toward improving access to communication networks, and in particular to wireless communication networks. Existing wireless communication networks may encompass large physical coverage areas and offer client devices ubiquitous access to Internet. However, as the size of wireless communication networks increase, so too does the need to provide additional wireless access points. With the growing number of wireless access points deployed within wireless communication networks comes an increased burden of managing the security of the wireless communication networks.

Multiple Institute of Electrical and Electronics Engineers (IEEE) 802.11 standards are provided for managing performance and security of client devices connected to access points of wireless communication networks. Wi-Fi Protected Access (WPA) and WPA II (WPA2) Personal (also known as WPA pre-shared key (WPAPSK)) are two examples of such a standard, which employs a PSK that is shared/known by both the access points forming a wireless communication network and the participating client devices that are authorized to access the wireless communication network. This need to distribute the PSK to many users represents a disadvantage of WPA/WPA2 Personal. For example, should a PSK for a wireless network of an enterprise network be disclosed or discovered by a malicious third party or should a user leave the organization, the PSK for should be invalidated and changed for all client devices and all of the access points associated with the wireless network.

Another available standard is WPA Enterprise, which overcomes the drawback of the WPA Personal standard by asking each of the client devices to self-authenticate via a Remote Authentication Dial-In User Service (RADIUS) server, thereby providing an enhanced level of security in wireless communications networks. However, using this authentication approach configuration of client devices is more complicated and users are required to enter two pieces of information (i.e. a username and a password).

Alternative approaches for authentication of wireless client devices in wireless networks involve allocation of a unique PSK to each user (device) in an attempt to retain the simplicity of WPA/WPA2 Personal but with the improved security of WPA/WPA2 Enterprise. These approaches provide and share a unique pre shared key in form of a Private PSK (PPSKs) or a Dynamic PSK (DPSKs) with the client devices. However, these approaches suffer from limitations relating to the number of configured users as the PSKs are stored on wireless LAN controllers (also referred to as AP controllers). In view of the foregoing, there is a need for further improvement in current techniques used for authentication of the client devices in networks.

SUMMARY

Systems and methods are described for authenticating client devices accessing a wireless communication network through an access point communicatively coupled with an authentication server. According to one embodiment, the authentication server receives an authentication request from the access point associated with a wireless network or a wireless local area network (LAN) controller that manages the access point to establish an encrypted communication channel between a client and the access point. The authentication request includes a first message integrity code (MIC) of a client-specific pre-shared key, which was generated using a pair-wise master key (PMK) known to the client and attributes including a media access control (MAC) address of the access point, a nonce value of the access point, a MAC address of the client and a nonce value of the client. In response to receipt of the authentication request, the authentication server validates the first MIC by receiving the attributes from the access point or the wireless LAN controller and determining a second MIC based on the client-specific pre-shared key of the client known to the authentication server and the one or more received attributes. The client-specific pre-shared key known to the authentication server can be extracted from a key database including various entries, where each entry includes any or a combination of a MAC address of a specific client, a service set identifier (SSID) of the access point, a client-specific pre-shared key assigned by the authentication server to the specific client and a PMK known to the authentication server. The authentication server validates the client-specific pre-shared key to be authentic when the first MIC matches with the second MIC.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for authenticating client devices accessing a wireless communication network through an access point communicatively coupled with an authentication server. According to one embodiment, a novel approach for using a client-specific pre-shared key to authenticate a client device involves the use of an authentication server (e.g., an external remote authentication dial-in user service (RADIUS) server) and modifications of the typical IEEE 802.1x exchange. For example, as described in further detail below, a RADIUS-based authentication of the client device can be performed responsive to a request from an authenticator (e.g., an access point to which the client device is attempting to access or a controller that manages the access point) with the MAC address of the client device serving as a username and a message integrity code (MIC) of the client-specific pre-shared key serving as a password.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

A "wireless access point (WAP)" or simply an "access point (AP)" generally refers to a hardware device or configured node on a local area network (LAN) that allows wireless capable devices and wired networks to connect through a wireless standard (e.g., the IEEE 802.11 family of standards and Bluetooth). Wi-Fi is a family of radio technologies commonly used for wireless local area networking (WLAN) of devices. It is based on the IEEE 802.11 family of standards. Wi-Fi is a trademark of the Wi-Fi Alliance.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Systems and methods are described for authenticating client devices accessing a wireless communication network through an access point communicatively coupled with an authentication server. According to one embodiment, the authentication server receives an authentication request from the access point associated with a wireless network or a wireless local area network (LAN) controller that manages the access point to establish an encrypted communication channel between a client device and the access point. The authentication request includes a first message integrity code (MIC) of a client-specific pre-shared key, which was generated using a pair-wise master key (PMK) known to the client device and attributes including a media access control (MAC) address of the access point, a nonce value of the access point, a MAC address of the client device and a nonce value of the client device. In response to receipt of the authentication request, the authentication server validates the first MIC by receiving the attributes from the access point or the wireless LAN controller and determining a second MIC based on the client-specific pre-shared key of the client device known to the authentication server and the one or more received attributes. The client-specific pre-shared key known to the authentication server can be extracted from a key database including various entries, where each entry includes any or a combination of a MAC address of a specific client device, a service set identifier (SSID) of the access point, a client-specific pre-shared key assigned by the authentication server to the specific client device and a PMK known to the authentication server. The authentication server validates the client-specific pre-shared key to be authentic when the first MIC matches with the second MIC.

Figure 1:
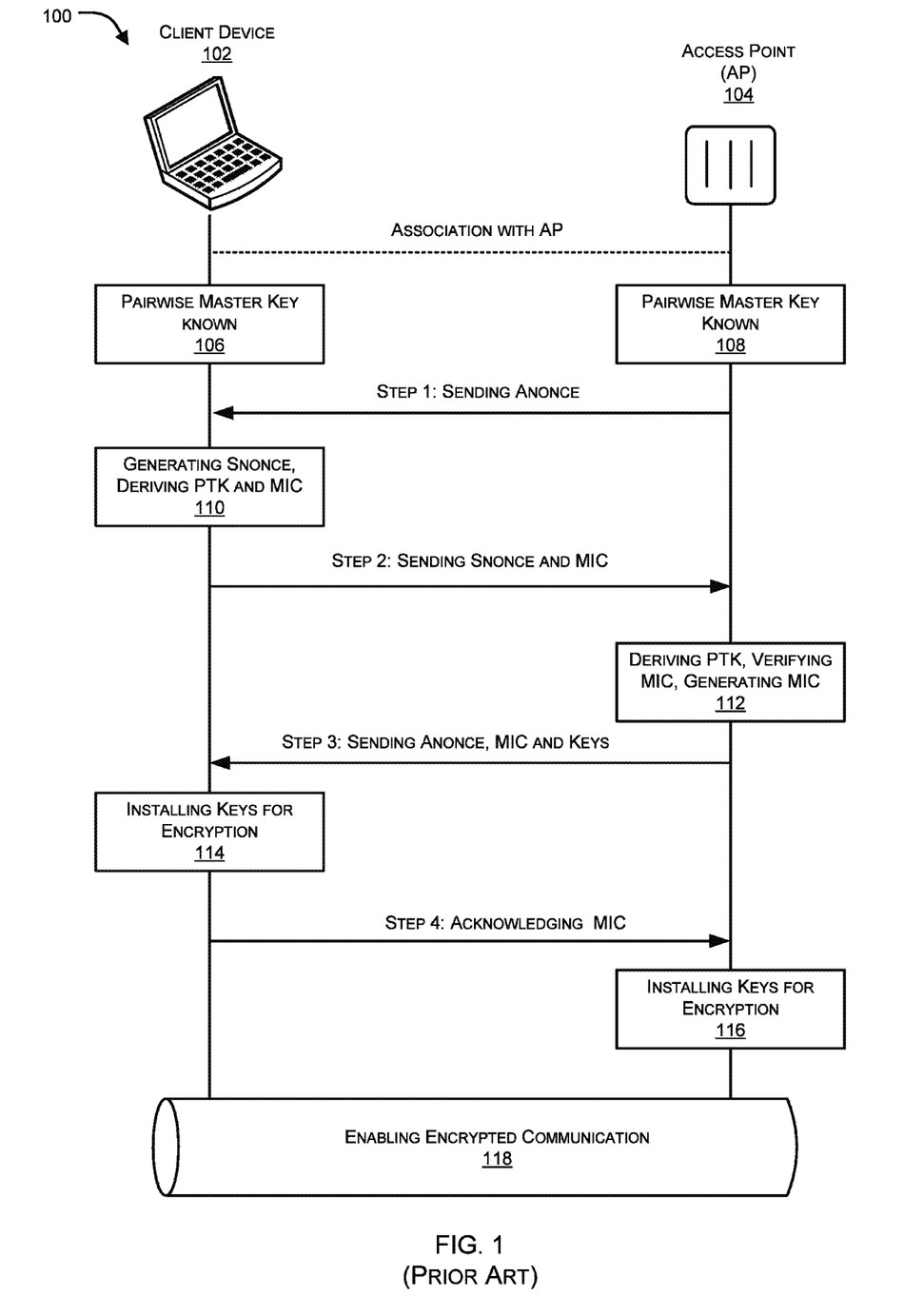
FIG. 1 illustrates a prior art approach for establishing temporary or transient keys between a wireless client and an access point.

FIG. 1 illustrates a prior art approach 100 for establishing temporary or transient keys between a wireless client and an access point. An association is formed between a client device 102 and an access point 104, which also acts as an authenticator. Client device 102 and access point 104 both generate a pre-shared key (PSK) which is equivalent to pair-wise master key (PMK) in WPA2 Personal. The PMK 106 is known to client device 102 and PMK 108 is known to access point 104. In an implementation, PSK/PMK can be generated using the following:

$$PSK/PMK=PBKDF2(Passphrase, SSID, SSIDLength, iterations, keylength)$$

where, iterations=4096
keylength=256 bits

The PSK/PMK can then be used by both client device 102 and access point 104 to prove to each other that they know the PSK by using a 4-way handshake and to establish the temporary or transient keys with access point 104. In an implementation, at step 1, access point 104 can send its nonce value (e.g., Anonce) to client device 102 so that at block 110, client device 102 can derive the PTK from the known PMK 106 and can generate a nonce value of client device 102 (e.g., Snonce) Further, client device 102 can derive the MIC based on the derived PTK and other attributes, for example, such as the MAC address of access point 104, a MAC address of client device 102, the nonce value from the client device 102, and the like. At step 2, client device 102 can send its nonce value and the MIC to access point 104 so that at block 112, access point 104 can derive the PTK from the PMK 108 known to access point 104, and generate the MIC based on the derived PTK. Access point 104 can then verify whether the MIC generated at access point 104 matches with the MIC received from client device 102.

In one implementation, respective PTKs can be calculated using the following:

PTK=PRF(PMK,"Pairwise key expansion",Min (AP_MAC,Supplicant_MAC)||Max(AP_MAC, Supplicant_MAC)||Min(ANonce,SNonce)||Max (ANonce,SNonce))

where:
PRF=Pseudo Random Function
AP_MAC=MAC address of the AP (or the AP controller)
Supplicant_MAC=Client MAC Address
ANonce=AP Nonce
SNonce=Supplicant Nonce
PMK=Pairwise Master Key On successful verification by access point 104, at step 3, access point 104 can send its nonce value, the verified MIC and encryption keys to client device 102 so that at block 114, client device 102 can install keys for encryption. On successful installation, at step 4, client device 102 can acknowledge the MIC to access point 104 so that at block 116, access point 104 can also install keys for encryption. On successful installation, at block 118, an encrypted communication channel can be established between client device 102 and access point 104.

Figure 2:
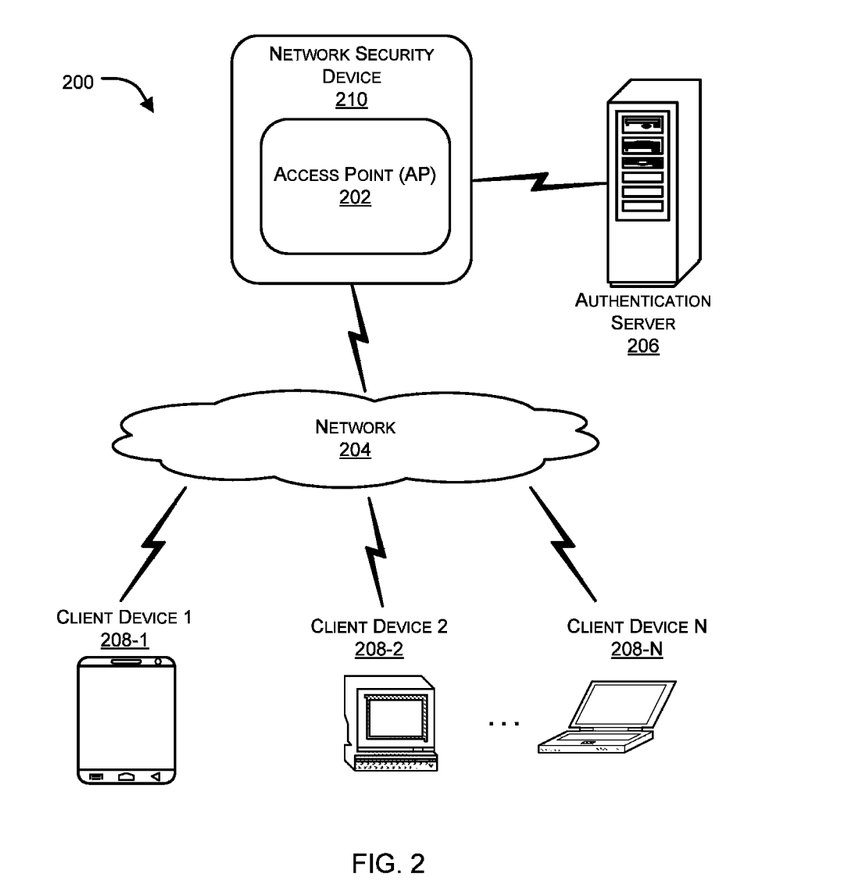
FIG. 2 is network architecture in which aspects of the present invention can be implemented in accordance with an embodiment of the present invention.

FIG. 2 is network architecture 200 in which aspects of the present invention can be implemented in accordance with an embodiment of the present invention. In network architecture 200, an authentication server 206 can be used to authenticate various computing devices associated with a network 204 before providing them with access to a wireless network, for example, with which access point 202 is associated. The authentication server 260 may be coupled to network 204 through network security device 210, e.g. a gateway device, providing an access point 202. Client devices 208-1, 208-2 . . . 208-N (which may be collectively referred to as client devices 208 and individually referred to as client device 208, hereinafter) within network 204 are representative of the various computing devices that might be authenticated by authentication server 206. Client devices 208 may include, but are not limited to, personal computers, smart devices, web-enabled devices, hand-held devices, laptops, mobile phones and the like, to enable interaction with network 204.

Those skilled in the art will appreciate that, network 204 can be wireless network, wired network or a combination thereof that can be implemented as one of the different types of networks, such as Intranet, Local Area Network (LAN), Wide Area Network (WAN), Internet, and the like. Further, network 204 can either be dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

According to an embodiment, authentication server 206 can receive an authentication request from access point 202 or from a network security device 210 that acts as a wireless LAN controller and manages access point 202. The request can include a first MIC of a client-specific PSK to establish an encrypted communication channel between a client device (e.g., client device 208) and the access point 202. The first MIC can be generated using a PMK known to client device 208 and attributes including a MAC address of access point 202, a nonce value of access point 202, a MAC address of client device 208 and a nonce value of client device 208. In an example, the first MIC can be generated based on deriving a PTK from the PMK at client device 208. As described further below with reference to FIG. 6A, the PTK may be divided into a combination of 128-bit key confirmation key (KCK), 128-bit key encryption key (KEK), and 128-bit temporary encryption key (TEK).

In an implementation, authentication server 206 can operate as an external remote authentication dial-in user service (RADIUS) server and may receive the attributes from access point 202 or network security device 210 via a web application programming interface (API) authentication call and in response to the receipt of the API authentication call, authentication server 206 can perform a RADIUS-based authentication with the MAC address of client device 208 serving as a username and the first MIC serving as a password.

In one embodiment, in response to receipt of the authentication request, authentication server 206 can validate the first MIC by receiving the attributes from access point 202 or network security device 210 and determining a second MIC based on the client-specific PSK of client device 208 known to authentication server 206 and the received attributes. Then, the client-specific PSK can be confirmed to be authentic when the first MIC matches with the second MIC.

In one embodiment, the second MIC can be generated based on deriving the PTK from the PMK at authentication server 206 and the client-specific PSK known to authentication server 206 can be extracted from a key database including various entries. For example, each entry of the key database may include any or a combination of a MAC address of a specific client device (e.g., client device 208-1 of client devices 208), a SSID of access point 202, a client-specific PSK assigned by authentication server 206 to client device 208-1, a PMK known to authentication server 206, etc. Those skilled in the art will appreciate that the client specific PSK can be discarded from the key database when client device 208 is no longer associated with network 204. In one embodiment, as the PSK/PMK is salted with the SSID, those skilled in the art will appreciate, the client-specific PSK of client devices 208 is regenerated when the SSID of access point 202 is changed.

According to an embodiment, when there is an initial connection between access point 210 and a new client device e.g. 208-2 in which there is not yet an association between a MAC address of new client device 208-2 and a second client-specific PSK assigned by authentication server 206 to new client device 208-2, authentication server 206 can locate an entry containing the second client-specific PSK key by comparing the MIC provided by new client device 208-2 to the client-specific PSKs of those entries not yet bound to a particular MAC address. Authentication server 206 can assign the second client-specific PSK as the client-specific PSK for new client device 208-2 by binding the MAC address of new client device 208-2 with the respective PMK key of the located entry containing the second client-specific PSK so that authentication server 206 can subsequently authenticate new client device 208-2 based on the second client-specific PSK.

Figure 3:
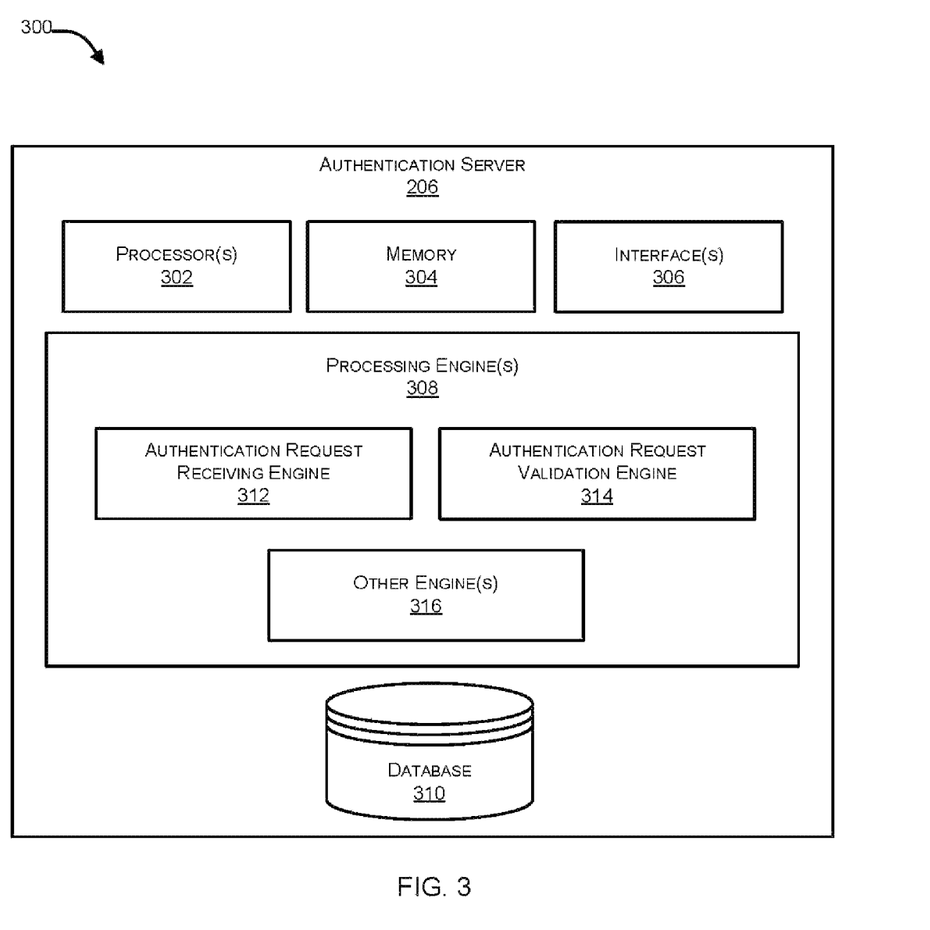
FIG. 3 is a block diagram illustrating functional components of an authentication server in accordance with an embodiment of the present invention.

FIG. 3 is a block diagram illustrating functional components of an authentication server 206 in accordance with an embodiment of the present invention. In the context of the present example, authentication server 206 can include one or more processor(s) 302. Processor(s) 302 can be implemented as one or more microprocessors, microcomputers, microcontrollers, digital signal processors, central processing units, logic circuitries, and/or any devices that manipulate data based on operational instructions. Among other capabilities, processor(s) 302 are configured to fetch and execute computer-readable instructions stored in a memory 304 of authentication server 206. Memory 304 can store one or more computer-readable instructions or routines, which may be fetched and executed to create or share the data units over a network service. Memory 304 can include any non-transitory storage device including, for example, volatile memory such as RAM, or non-volatile memory such as EPROM, flash memory, and the like. In an example embodiment, memory 304 may be a local memory or may be located remotely, such as a server, a file server, a data server, and the Cloud.

Authentication server 206 can also include one or more Interface(s) 306. Interface(s) 306 may include a variety of interfaces, for example, interfaces for data input and output devices, referred to as I/O devices, storage devices, and the like. Interface(s) 306 may facilitate communication of authentication server 206 with various devices coupled to authentication server 206. Interface(s) 306 may also provide a communication pathway for one or more components of authentication server 206. Examples of such components include, but are not limited to, processing engine(s) 308 and database 310.

Processing engine(s) 308 can be implemented as a combination of hardware and software or firmware programming (for example, programmable instructions) to implement one or more functionalities of engine(s) 308. In the examples described herein, such combinations of hardware and software or firmware programming may be implemented in several different ways. For example, the programming for the engine(s) 308 may be processor executable instructions stored on a non-transitory machine-readable storage medium and the hardware for engine(s) 308 may include a processing resource (for example, one or more processors), to execute such instructions. In the examples, the machine-readable storage medium may store instructions that, when executed by the processing resource, implement engine(s) 308. In such examples, authentication server 206 can include the machine-readable storage medium storing the instructions and the processing resource to execute the instructions, or the machine-readable storage medium may be separate but accessible to authentication server 206 and the processing resource. In other examples, processing engine(s) 308 may be implemented by electronic circuitry. Database 310 can include data that is either stored or generated as a result of functionalities implemented by any of the components of processing engine(s) 308.

In an example, processing engine(s) 308 can include an authentication request receiving engine 312, an authentication request validation engine 314 and other engine(s) 316. Other engine(s) 316 can implement functionalities that supplement applications or functions performed by authentication server 206 or processing engine(s) 308.

According to an embodiment, authentication request receiving engine 312 can receive an authentication request from an access point associated with a wireless network or a wireless LAN controller (e.g., network security device 210) that manages the access point to establish an encrypted communication channel between a client device and the access point. The authentication request can include a first MIC of a client-specific PSK, which was generated using a PMK known to the client device and attributes including a MAC address of the access point, a nonce value of the access point, a MAC address of the client device and a nonce value of the client device.

According to an embodiment, authentication request validation engine 314 can validate the first MIC by receiving the attributes from the access point and determining a second MIC based on the client-specific PSK of the client known to authentication server 206 and the received attributes. In an implementation, the client-specific PSK known to authentication server 206 can be extracted from a key database including various entries, where each entry includes any or a combination of a MAC address of a specific client device, a SSID of the access point, a client-specific PSK assigned by authentication server 206 to the specific client device, a PMK known to authentication server 206, and the like. Further, authentication request validation engine 314 can validate the client-specific PSK to be authentic when the first MIC matches with the second MIC.

Figure 4:
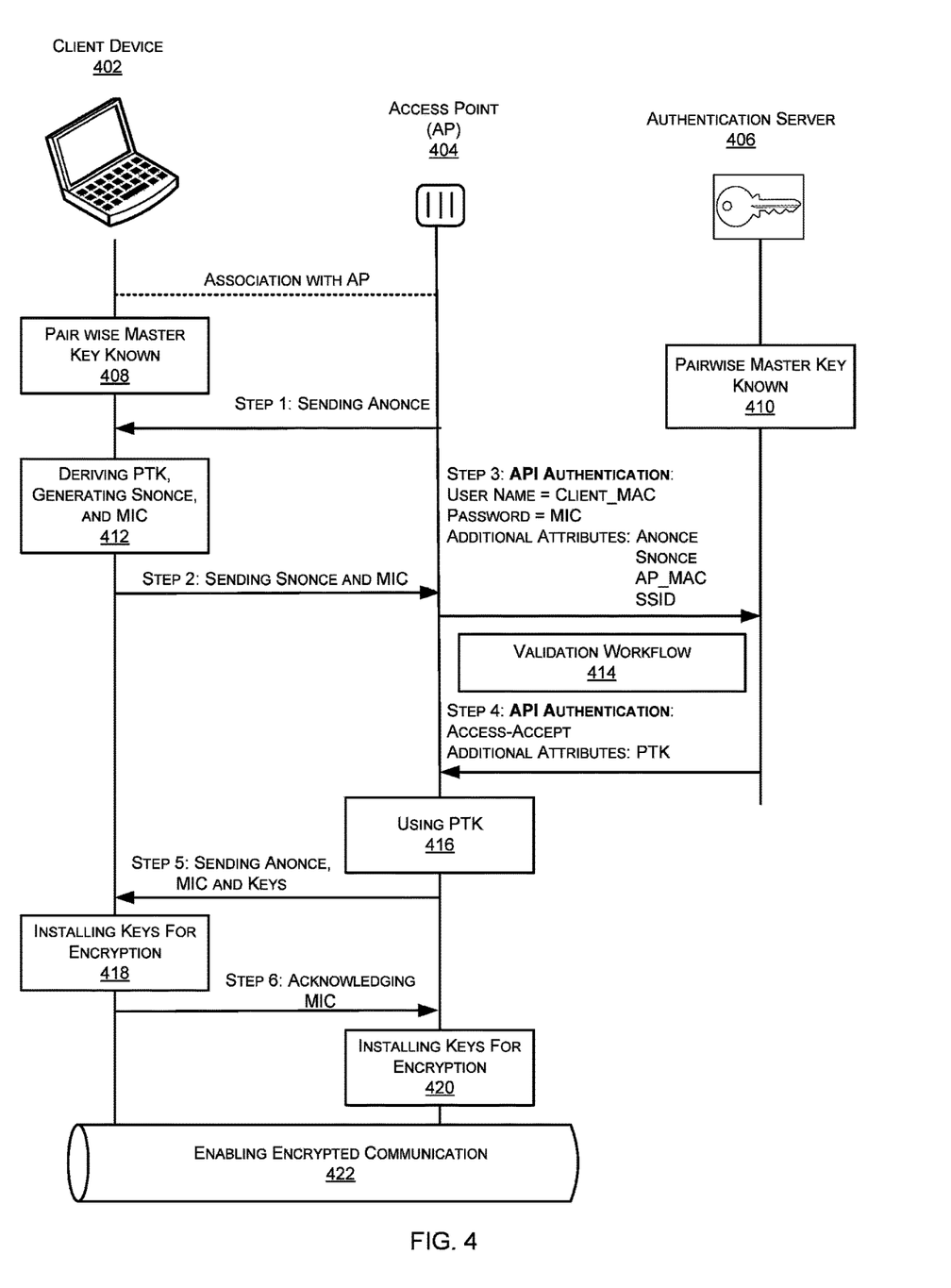
FIG. 4 is a sequence diagram illustrating interactions among a client device, an access point and an authentication server to authenticate the client device in accordance with an embodiment of the present invention.

FIG. 4 is a sequence diagram 400 illustrating interactions among a client device 402, an access point 404 and an authentication server 406 to authenticate the client device in accordance with an embodiment of the present invention. While in the context of the present example, interactions are shown between the authentication server 406 are the access point 404 (as the authenticator), it is to be understood that a wireless LAN controller or a network security device serving as an AP controller for the AP 404 might be logically interposed between the AP 404 and the authentication server 406 in alternative embodiments and may act as the authenticator.

In the context of the present example, PSK/PMK is known to client device 402 and authentication server 406 therefore, validation workflow includes authentication server 406 validating the MIC via API communication and returning the PTK. While in the context of the present example, the PTK is not authenticated directly, it is done so indirectly as a result of the authentication server 406 analyzing whether the MIC is valid or not, which in turns proves that client device 402 has provided the correct PTK.

In the context of workflow 400, at step 1, client device 402 can receive a nonce value of access point 404 (e.g., Anonce) from access point 404 so that, at block 412, client device 402 can derive the PTK from the known PMK 408 and generate a nonce value (e.g., Snonce) of client device 402. Further, client device 402 can generate a MIC based on the derived PTK and attributes such as a MAC address of access point 404, a MAC address of client device 402, the Snonce, and the like.

At step 2, client device 402 can send the generated MIC along with the Snonce to access point 404. At step 3, an authentication request including the MIC (the first MIC) generated by client device 402 can be sent to authentication server 406 by access point 404 so that authentication server 406 can initiate validation workflow 414 by receiving attributes from access point 404. During validation workflow 414, authentication server 406 can independently determine a MIC (the second MIC) based on the client-specific PSK of client device 408, which is known to authentication server 406 and the attributes received from access point 404. The second MIC can be generated based on deriving the PTK from the PMK 410. The client-specific PSK known authentication server 406 can be extracted from a key database as described above, for example, comprising entries, where each entry includes any or a combination of a MAC address of a specific client, a SSID of access point 404, a client-specific PSK assigned by authentication server 406 to the specific client device 402 and a PMK 410, which is known to authentication server 406. Authentication server 406 can validate the client-specific PSK to be authentic when the first MIC received from access point 404 matches with the second MIC generated by authentication server 406.

On successful validation, authentication server 406 can send access-accept information and the PTK to access point 404 so that at block 416, access point 416 can use the PTK for encryption keys and at step 5, access point 104 can send the Anonce, verified MIC and encryption keys to client device 402. At block 418, client device 402 can install keys for encryption. On successful installation, at step 6, client device 402 can acknowledge the MIC to access point 404 so that at block 420, access point 404 can also install keys for encryption. On successful installation, at block 422, encrypted communication channel can be established between client 402 and access point 404.

Figure 5:
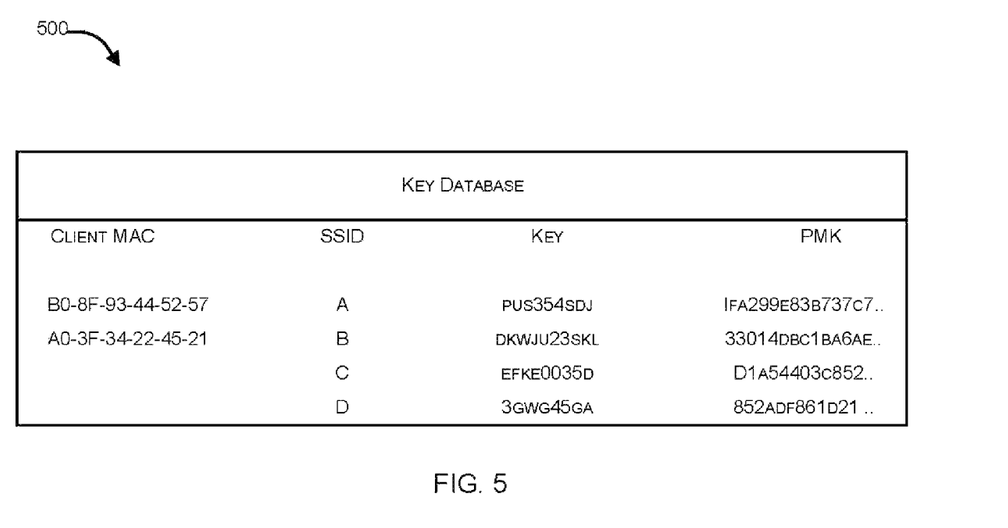
FIG. 5 illustrates an exemplary key database maintained by an authentication server in accordance with an embodiment of the present invention.

FIG. 5 illustrates an exemplary key database 500 maintained by authentication server in accordance with an embodiment of the present invention. According to an embodiment, each entry of database 500, which is maintained by the authentication server, can include any or a combination of a MAC address of a specific client device, an SSID of an access point, a client-specific PSK assigned by the authentication server to the specific client device, and a PMK. Those skilled in the art will appreciate that on the first connection between the client device with the access point there is no association between the client device and its assigned PSK, therefore, the authentication server can locate an entry containing the PSK by comparing MIC of the new client device to the PSKs of those entries not yet bound to a particular MAC address. For example, authentication server 406 can parse through each unassigned key looking for a match (e.g., the keys of entry 3 and entry 4 in database 500). When a successful match is found, the MAC address of the client device can be bound to the PSK so that in future validation can be performed directly using the PSK.

In one implementation, due to the use of a large number (e.g., 4096) of iterations of a hashing algorithm to generate the PSK/PMK, it would be computationally intensive to calculate the values with each password check when the MAC address is not assigned to a passcode (and all unassigned passcodes require checking). The PSK/PMK therefore can be calculated when the passcode is created, which has the trade-off that these values will be regenerated if the SSID changes (as the PSK/PMK is salted with the SSID).

Figure 6A:
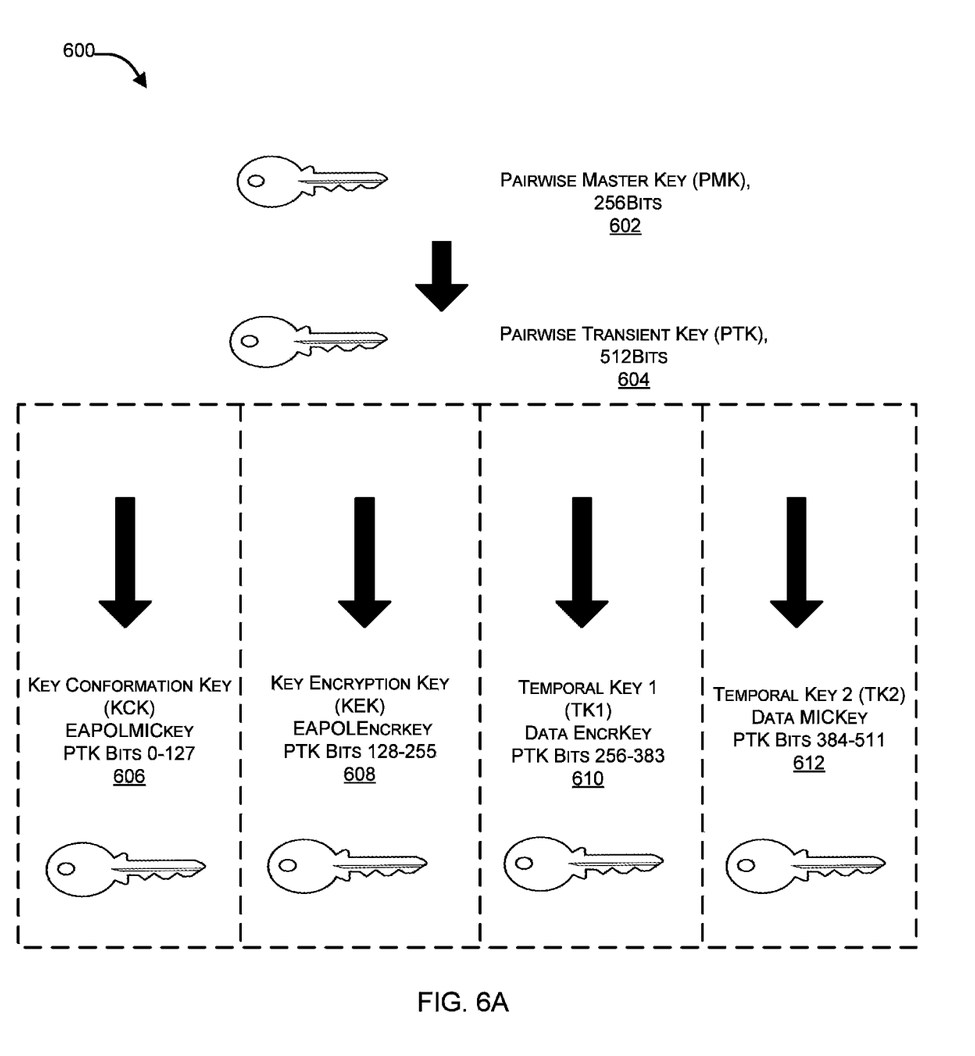
FIG. 6A is a block diagram illustrating a process for validation of a message integrity code (MIC) in accordance with an embodiment of the present invention.
Figure 6B:
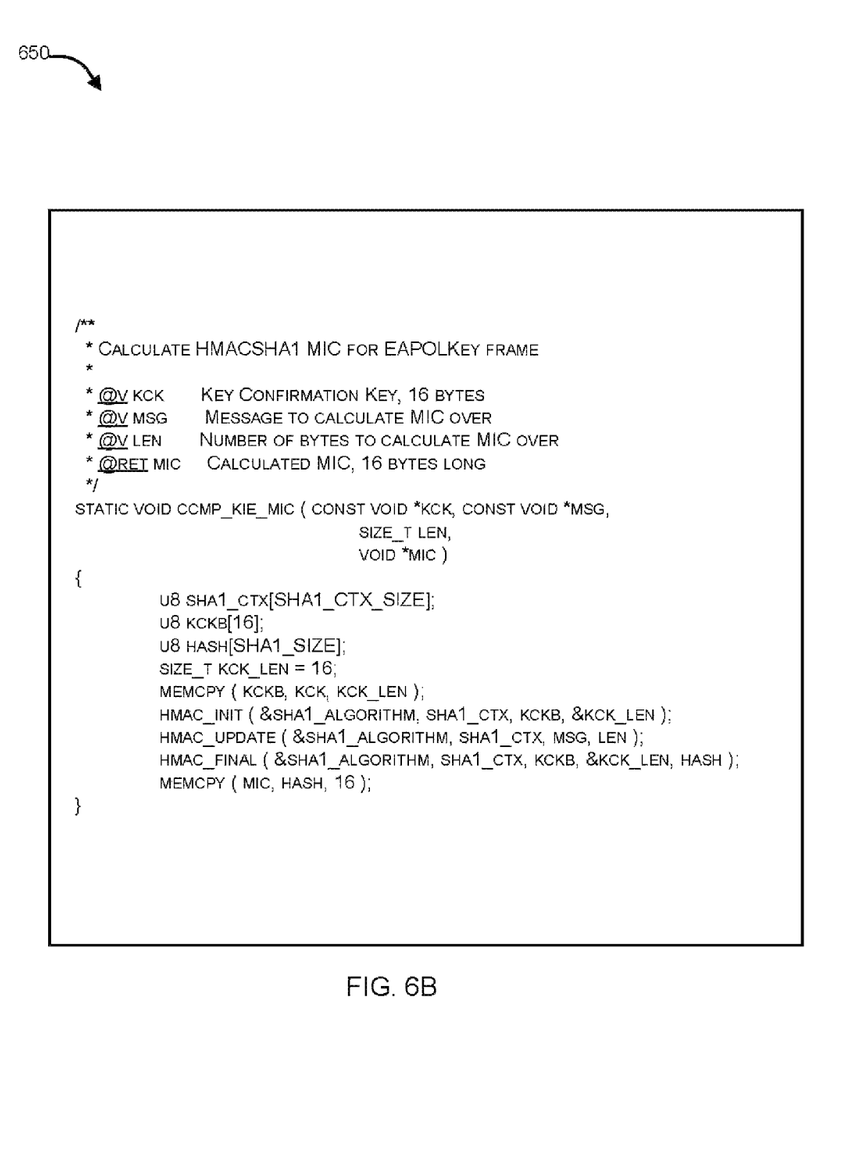
FIG. 6B is exemplary MIC validation code in accordance with an embodiment of the present invention.

FIG. 6A is a block diagram illustrating a process for validation of a message integrity code (MIC) in accordance with an embodiment of the present invention. FIG. 6B is exemplary MIC validation code in accordance with an embodiment of the present invention.

With reference to examples 600 and 650, a PTK 604, which is derived from the PMK 602 can be divided into a combination of a 128-bit KCK 606, a 128-bit KEK 608, and at least one 128-bit TEK, e.g. TK-1 610 and TK-2 612. The KCK 606 can be used to derive the MIC and the KEK 608 can be used to encrypt data. Therefore, the KCK 606 can be used to prove possession of the PMK and to bind the PMK to the authentication server.

In accordance with the 4-way handshake of sequence diagram 400, packets 1 and 2 can provide enough useful information to the authentication server in order to validate the MIC, where packet 1 can include nonce value of access point and MAC address of the access point and packet 2 can include nonce value of client device, MAC address of client device and MIC.

Further, the authentication server can use a known PMK to derive a PTK and use 0-127 bits of PTK (i.e. KCK 606) to calculate a second MIC. Further, the authentication server can compare the calculated second MIC with a first MIC received from an access point such that if the first MIC matches the second MIC, the authentication server can assume that the client device knows the PSK.

Figure 7:
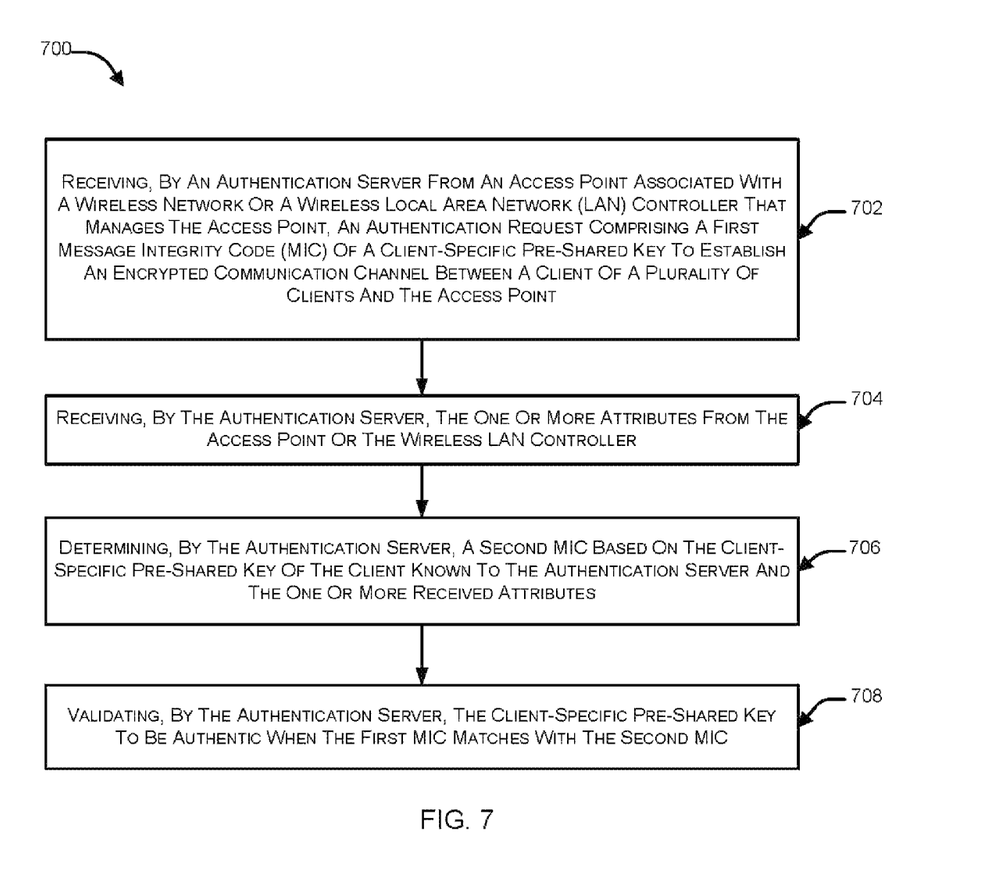
FIG. 7 is a flow diagram illustrating a process for authentication of a client device in accordance with an embodiment of the present invention.

FIG. 7 is a flow diagram 700 illustrating a process for authentication of a client device in accordance with an embodiment of the present invention. In the context of flow diagram 700, at block 702, an authentication server receives an authentication request from an authenticator (e.g., (i) an access point associated with a wireless network or (ii) a wireless LAN controller that manages the access point). The authentication request can include a first MIC of a client-specific PSK to establish an encrypted communication channel between a client device and the access point. The MIC can be generated using a PMK known to the client device and attributes including a MAC address of the access point, a nonce value of the access point, a MAC address of the client device and a nonce value of the client device.

In response to receipt of the authentication request the authentication server can validate the first MIC by at block 704, receiving the attributes from the access point or the wireless LAN controller and at block 706 determining a second MIC based on the client-specific PSK of the client device known to the authentication server and the received attributes such that at block 708, the client-specific PSK can be validated to be authentic when the first MIC matches with the second MIC.

According to an embodiment, the client-specific PSK known to the authentication server can be extracted from a key database comprising various entries where each entry includes any or a combination of a MAC address of a specific client device of various client devices, a SSID of the access point, a client-specific PSK assigned by the authentication server to the specific client device and a PMK known to the authentication server.

Figure 8:
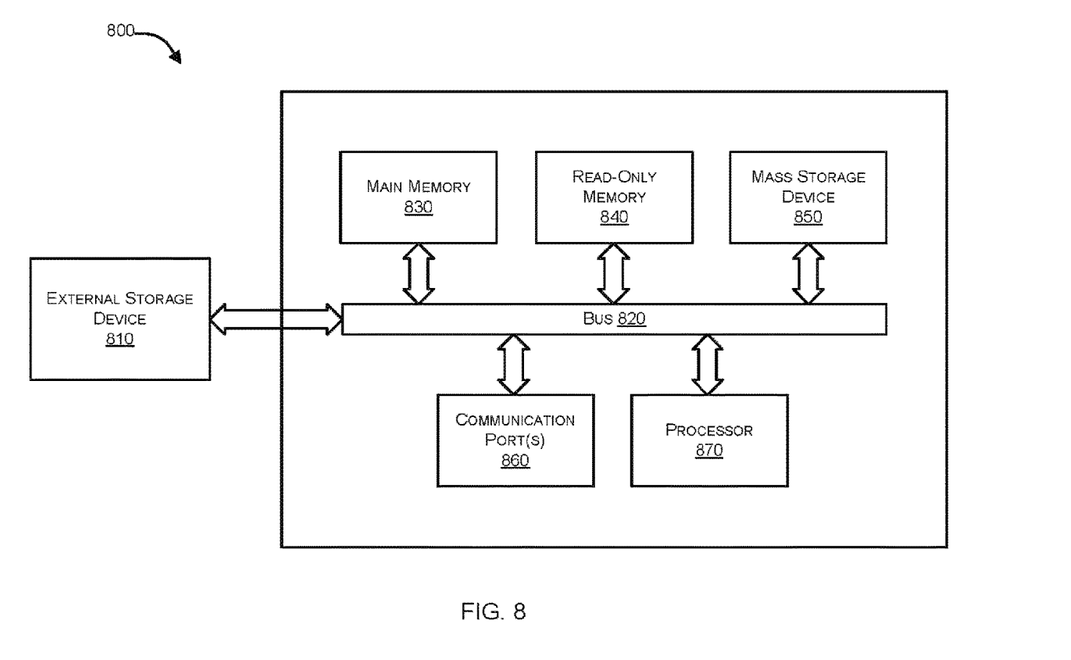
FIG. 8 illustrates an exemplary computer system in which or with which embodiments of the present invention may be utilized.

FIG. 8 illustrates an exemplary computer system 800 in which or with which embodiments of the present invention may be utilized. As shown in FIG. 8, computer system includes an external storage device 810, a bus 820, a main memory 830, a read only memory 840, a mass storage device 850, a communication port 860, and a processor 870. Computer system may represent some portion of authentication server 206.

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 870 may include various modules associated with embodiments of the present invention.

Communication port 860 can be any of an RS-232 port for use with a modem-based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:

receiving, by an authentication server from an access point associated with a wireless network or a wireless local area network (LAN) controller that manages the access point, an authentication request comprising a first message integrity code (MIC) of a client-specific pre-shared key to establish an encrypted communication channel between a client of a plurality of clients and the access point, wherein the first MIC was generated using a pair-wise master key (PMK) known to the client and one or more attributes including a media access control (MAC) address of the access point; and responsive to receipt of the authentication request, validating the first MIC by:

receiving, by the authentication server, the one or more attributes from the access point or the wireless LAN controller;

determining, by the authentication server, a second MIC based on the client-specific pre-shared key of the client known to the authentication server and the one or more received attributes, wherein the client-specific pre-shared key known to the authentication server is extracted from a key database comprising a plurality of entries, each entry including any or a combination of a MAC address of a specific client of the plurality of clients, a service set identifier (SSID) of the access point, a client-specific pre-shared key assigned by the authentication server to the specific client and a PMK known to the authentication server; and validating, by the authentication server, the client-specific pre-shared key to be authentic when the first MIC matches with the second MIC.

2. The method of claim 1, responsive to a first connection between the access point and a new client device in which there is not yet an association between a MAC address of the new client device and a second client-specific pre-shared key assigned by the authentication server to the new client device:

locating, by the authentication server, an entry of the plurality of entries containing the second client-specific pre-shared key by comparing the first MIC provided by the new client device to the client-specific pre-shared keys of those entries of the plurality of entries not yet bound to a particular MAC address; and assigning the second client-specific pre-shared key as the client-specific pre-shared key for the new client device by binding the MAC address of the new client device with the PMK key of the located entry containing the second client-specific pre-shared key.

3. The method of claim 2, wherein the new client is subsequently authenticated by the authentication server based on the second client-specific pre-shared key.

4. The method of claim 1, wherein the authentication server operates as an external remote authentication dial-in user service (RADIUS) server, wherein said receiving, by the authentication server, the one or more attributes from the access point or the wireless LAN controller comprises receiving a web application programming interface (API) authentication call and responsive thereto performing a RADIUS-based authentication with the MAC address of the client serving as a username and the first MIC serving as a password.

5. The method of claim 1, wherein the first MIC is generated based on deriving a pair-wise transient key (PTK) from the PMK at the client device.

6. The method of claim 1, wherein the second MIC is generated based on deriving the PTK from the PMK at the authentication server.

7. The method of claim 6, wherein the PTK is divided into a combination of 128-bit key confirmation key (KCK), 128-bit key encryption key (KEK), and 128-bit temporary encryption key (TEK).

8. The method of claim 1, wherein the client specific pre-shared key is discarded from the key database when the client device is disconnected from the network.

9. A non-transitory computer-readable storage medium embodying a set of instructions, which when executed by one or more processors of an authentication server, causes the one or more processors to perform a method comprising:

receiving, by the authentication server from an access point associated with a wireless network or a wireless local area network (LAN) controller that manages the access point, an authentication request comprising a first message integrity code (MIC) of a client-specific pre-shared key to establish an encrypted communication channel between a client of a plurality of clients and the access point, wherein the first MIC was generated using a pair-wise master key (PMK) known to the client and one or more attributes including a media access control (MAC) address of the access point; and responsive to receipt of the authentication request, validating the first MIC by:

receiving, by the authentication server, the one or more attributes from the access point or the wireless LAN controller;

determining, by the authentication server, a second MIC based on the client-specific pre-shared key of the client known to the authentication server and the one or more received attributes, wherein the client-specific pre-shared key known to the authentication server is extracted from a key database comprising a plurality of entries, each entry including any or a combination of a MAC address of a specific client of the plurality of clients, a service set identifier (SSID) of the access point, a client-specific pre-shared key assigned by the authentication server to the specific client and a PMK known to the authentication server; and validating, by the authentication server, the client-specific pre-shared key to be authentic when the first MIC matches with the second MIC.

10. The non-transitory computer-readable storage medium of claim 9, responsive to a first connection between the access point and a new client device in which there is not yet an association between a MAC address of the new client device and a second client-specific pre-shared key assigned by the authentication server to the new client device:

locating, by the authentication server, an entry of the plurality of entries containing the second client-specific pre-shared key by comparing the first MIC provided by the new client device to the client-specific pre-shared keys of those entries of the plurality of entries not yet bound to a particular MAC address; and assigning the second client-specific pre-shared key as the client-specific pre-shared key for the new client device by binding the MAC address of the new client device with the PMK key of the located entry containing the second client-specific pre-shared key.

11. The non-transitory computer-readable storage medium of claim 10, wherein the new client is subsequently authenticated by the authentication server based on the second client-specific pre-shared key.

12. The non-transitory computer-readable storage medium of claim 9, wherein the authentication server operates as an external remote authentication dial-in user service (RADIUS) server, wherein said receiving, by the authentication server, the one or more attributes from the access point or the wireless LAN controller comprises receiving a web application programming interface (API) authentication call and responsive thereto performing a RADIUS-based authentication with the MAC address of the client serving as a username and the first MIC serving as a password.

13. The non-transitory computer-readable storage medium of claim 9, wherein the first message integrity code (MIC) is generated based on deriving a pair-wise transient key (PTK) from the PMK at the client device.

14. The non-transitory computer-readable storage medium of claim 9, wherein the second MIC is generated based on deriving the PTK from the PMK at the authentication server.

15. The non-transitory computer-readable storage medium of claim 14, wherein the PTK is divided into a combination of 128-bit key confirmation key (KCK), 128-bit key encryption key (KEK), and 128-bit temporary encryption key (TEK).

16. The non-transitory computer-readable storage medium of claim 9, wherein the client specific pre-shared key is discarded from the key database when the client device is disconnected from the network.

17. A system, the system comprising:
an authentication server; and
a non-transitory computer-readable storage medium embodying a set of instructions, which when executed by a processing resource of the authentication server, causes the one or more processors to perform a method comprising:

receiving, by the authentication server from an access point associated with a wireless network or a wireless local area network (LAN) controller that manages the access point, an authentication request comprising a first message integrity code (MIC) of a client-specific pre-shared key to establish an encrypted communication channel between a client of a plurality of clients and the access point, wherein the first MIC was generated using a pair-wise master key (PMK) known to the client and one or more attributes including a media access control (MAC) address of the access point and a nonce value of the access point; and responsive to receipt of the authentication request, validating the first MIC by:

receiving, by the authentication server, the one or more attributes from the access point or the wireless LAN controller;

determining, by the authentication server, a second MIC based on the client-specific pre-shared key of the client known to the authentication server and the one or more received attributes, wherein the client-specific pre-shared key known to the authentication server is extracted from a key database comprising a plurality of entries, each entry including any or a combination of a MAC address of a specific client of the plurality of clients, a service set identifier (SSID) of the access point, a client-specific pre-shared key assigned by the authentication server to the specific client and a PMK known to the authentication server; and     validating, by the authentication server, the client-specific pre-shared key to be authentic when the first MIC matches with the second MIC.

18. The system of claim 17, wherein the non-transitory computer-readable storage medium further embodies instructions, which when executed by a processing resource of the authentication server, causes the one or more processors:

responsive to a first connection between the access point and a new client device in which there is not yet an association between a MAC address of the new client device and a second client-specific pre-shared key assigned by the authentication server to the new client device:

locating, by the authentication server, an entry of the plurality of entries containing the second client-specific pre-shared key by comparing the first MIC provided by the new client device to the client-specific pre-shared keys of those entries of the plurality of entries not yet bound to a particular MAC address; and     assigning the second client-specific pre-shared key as the client-specific pre-shared key for the new client device by binding the MAC address of the new client device with the PMK key of the located entry containing the second client-specific pre-shared key.

19. The system of claim 17, wherein the new client is subsequently authenticated by the authentication server based on the second client-specific pre-shared key.

20. The system of claim 17, wherein the authentication server operates as an external remote authentication dial-in user service (RADIUS) server, wherein said receiving, by the authentication server, the one or more attributes from the access point or the wireless LAN controller comprises receiving a web application programming interface (API) authentication call and responsive thereto performing a RADIUS-based authentication with the MAC address of the client serving as a username and the first MIC serving as a password.

\* \* \* \* \*